United States Patent
Wang et al.

(10) Patent No.: US 10,710,249 B2
(45) Date of Patent: Jul. 14, 2020

(54) 3 DOF PARALLEL MECHANISM WITH 3 BRANCHED-CHAINS

(71) Applicant: SHENZHEN INSTITUTES OF ADVANCED TECHNOLOGY CHINESE ACADEMY OF SCIENCES, Shenzhen (CN)

(72) Inventors: Yongfeng Wang, Shenzhen (CN); Guoru Zhao, Shenzhen (CN); Jing Yang, Shenzhen (CN); Xiaojun Zhang, Shenzhen (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 0 days.

(21) Appl. No.: 16/341,454

(22) PCT Filed: Nov. 14, 2016

(86) PCT No.: PCT/CN2016/105727
§ 371 (c)(1),
(2) Date: Apr. 12, 2019

(87) PCT Pub. No.: WO2018/072247
PCT Pub. Date: Apr. 26, 2018

(65) Prior Publication Data
US 2019/0375117 A1    Dec. 12, 2019

(30) Foreign Application Priority Data
Oct. 17, 2016    (CN) .......................... 2016 1 0902874

(51) Int. Cl.
*B25J 17/00*        (2006.01)
*B25J 17/02*        (2006.01)
*B25J 9/00*         (2006.01)

(52) U.S. Cl.
CPC ......... *B25J 17/0266* (2013.01); *B25J 9/0009* (2013.01); *B25J 9/0045* (2013.01)

(58) Field of Classification Search
CPC ..... B25J 17/0266; B25J 9/0009; B25J 9/0045
See application file for complete search history.

(56) References Cited

U.S. PATENT DOCUMENTS 8,888,789 B2 * 11/2014 Prisco ................ A61B 17/0218
                                                   606/130
9,254,178 B2 *  2/2016 Prisco ..................... A61B 34/71
(Continued)

FOREIGN PATENT DOCUMENTS

CN      102166749 A     8/2011
CN      103639712 A     3/2014
(Continued)

OTHER PUBLICATIONS

International Search Report issued in corresponding International application No. PCT/CN2016/105727, dated Jun. 30, 2017(2 pages).

*Primary Examiner* — Victor L MacArthur

(57) ABSTRACT

The present disclosure relates to a robot, and provides a 3 degree-of-freedom parallel mechanism with 3 branched-chains, which includes a fixed platform, a movable platform, and three arc-shaped connecting rods. The rotation axes of three arc-shaped connecting rods are intersected with each other and each rotation axes is parallel to the fixed platform. Each arc-shaped connecting rod has a sliding slot curved extending along a longitudinal direction. The three connecting shafts one-to-one corresponds to the three arc-shaped connecting rods and are disposed on the movable platform. A first end of each connecting shaft is fixedly connected with the movable platform. A second end is hinged joint with a connecting head. The connecting head is slid and disposed in the corresponding sliding slot.

5 Claims, 2 Drawing Sheets

(56) References Cited

U.S. PATENT DOCUMENTS

| | | | |
|---|---|---|---|
| 10,279,469 B2* | 5/2019 | Han | B23Q 1/5462 |
| 2004/0103739 A1* | 6/2004 | Brogardh | B23Q 1/5462 |
| | | | 74/490.01 |
| 2007/0255453 A1* | 11/2007 | Brogardh | B23Q 1/5462 |
| | | | 700/245 |
| 2015/0082934 A1 | 3/2015 | Trui et al. | |
| 2018/0126545 A1* | 5/2018 | Han | B23Q 1/5462 |
| 2019/0262984 A1* | 8/2019 | Han | B25J 9/003 |
| 2019/0389050 A1* | 12/2019 | Zhao | B25J 9/08 |
| 2019/0389054 A1* | 12/2019 | Zhao | B25J 9/08 |

FOREIGN PATENT DOCUMENTS

| | | |
|---|---|---|
| CN | 104308833 A | 1/2015 |
| CN | 104827463 A | 8/2015 |
| CN | 105150199 A | 12/2015 |
| CN | 105538296 A | 5/2016 |
| CN | 101334063 A | 12/2018 |
| JP | 2005-212079 A | 8/2005 |
| WO | WO2016/050923 A1 | 4/2016 |

\* cited by examiner

3 DOF PARALLEL MECHANISM WITH 3 BRANCHED-CHAINS

TECHNICAL FIELD

The present disclosure relates to the robot field, in particular to a 3 degree-of-freedom (DOF) parallel mechanism with 3 branched-chains.

BACKGROUND

Since a parallel robot was first proposed in 1938, a parallel robot has been widely used in various fields of society because of its large rigidity, strong bearing capacity, small error, high precision, small self-weight load ratio, good dynamic performance, and easy control, etc. At present, there is a common parallel robot with 2 degree-of-freedom (DOF), 3 DOF, 4 DOF, or 6 DOF. The parallel mechanism with 3 DOF has symmetric distribution of symmetrical branches and is most researched. It is applied in the fields of machining rotary platform, rehabilitation device, satellite positioning device, and installation device, etc.

For example, professor Feng Gao et al. of Yanshan University proposed an offset output a 3 DOF spherical parallel mechanism with a central spherical hinge (CN101306534), which has a typical mechanism features 3-RRR to achieve three-direction rotation around a fixed center. Professor Zhen Huang of Yanshan University proposes a parallel mechanism with symmetrical structure and no accompanying motion (CN102962840), which can continuous rotate in any axis or any point on the middle symmetry plane of the fixed or movable platform, and effectively avoid the occurrence of accompanying motion. Long Shen of Shanghai University proposes a spherical 3 DOF parallel mechanism antenna structure system (CN101924266), which has a larger working space than the general 3 DOF spherical mechanism. Rongfu Lin et al. of Shanghai Jiaotong University proposed a 3 DOF spherical parallel mechanism with arc-shaped sliding pairs (CN104827463), which uses the arc-shaped sliding pairs, the movable platform rotates in three directions around the arc-shaped midpoint is achieved.

Most kinematic pair configurations of these mechanism branches mostly include RR or RRR. The axes of the kinematic pair intersect at one point to achieve movement of 3 DOF of a movable platform. Lin Rongfu of Shanghai Jiao Tong University uses arc-shaped sliding pair. Thereby, the movable platform is bound by forces from three directions through arc-shaped configuration of the kinematic pair. It can only rotate in three directions around an arc-shaped center. The motion is rather complication and the control precision is not very high.

SUMMARY

The purpose of present disclosure is provided a 3 degree-of-freedom (DOF) parallel mechanism with 3 branched-chains capable of overcoming the problem that the parallel mechanism movement is complication and the control precision is not very high in the prior art.

The present disclosure is achieved as follow:

The present disclosure provides 3 degree-of-freedom (DOF) parallel mechanism with 3 branched-chains. Comprising a fixed platform, a movable platform disposed above the fixed platform, and three arc-shaped connecting rods. The three arc-shaped connecting rods are all rotated and connected with the fixed platform. The rotation axes of three arc-shaped connecting rods intersect with each other and each rotation axes is parallel to the fixed platform. Each arc-shaped connecting rod has a sliding slot curved extending along a longitudinal direction. Three connecting shafts one-to-one corresponds to the three arc-shaped connecting rods and are disposed on the movable platform. A first end of each connecting shaft is fixedly connected with the movable platform. A second end is hinged joint with a connecting head. The connecting head is slid and disposed in the corresponding sliding slot.

Furthermore, a connecting head and a corresponding connecting shaft are connected by a cross universal hinge.

Furthermore, two ends of each arc-shaped connecting rod are fixedly connected with the fixed platform through a connecting component. The two ends of each arc-shaped connecting rod are rotated and connected with the corresponding connecting component.

Furthermore, each connecting component comprises two supports fixedly disposed on the fixed platform. The two ends of each arc-shaped connecting rod are rotated and connected with the corresponding support by a pin shaft.

Furthermore, a motor is disposed on one of the supports of the corresponding connecting component, the pin shaft is driven to rotate by the motor.

Furthermore, the two supports are oppositely disposed. The two ends of each arc-shaped connecting rod are both disposed between the corresponding two supports.

Furthermore, a movable platform is a flat cylindrical shape. The three connecting shafts are evenly distributed along the outer circular surface of the movable platform.

Furthermore, three protrusions and the movable platform are integrally formed. Three protrusions one-to-one correspond to the three connecting shafts. The connecting shaft is fixed and connected with the corresponding protrusion.

The present disclosure has beneficial effects as follow:

In the parallel mechanism of the present disclosure, the movable platform is disposed above the fixed platform, and the movable platform is connected with the fixed platform through the three arc-shaped connecting rods. When one of the three arc-shaped connecting rods is rotated relative to the fixed platform, the other two connecting shafts is slid along the corresponding sliding slot through the corresponding connecting shaft. Since the sliding slot is an arc-shaped structure, the movable platform is overturned in the air. The movable platform is relatively stable during movement. The control precision is high, which avoids forming accompanying movement during movement. The structure of the above parallel mechanism is very simple and convenient to assemble.

BRIEF DESCRIPTION OF DRAWINGS

In order to clearly explain embodiment of the present disclosure or technical scheme of the prior art. The drawings are included to provide a further understanding of embodiments of the present disclosure, which form portions of the specification and are used to illustrate implementation manners of the present disclosure and are intended to illustrate operating principles of the present disclosure together with the description. Obviously, the drawings in the following description are merely some of the embodiments of the present disclosure, and those skilled in the art are able to obtain other drawings according to the drawings without contributing any inventive labor.

DETAILED DESCRIPTION

A technical proposal in the embodiments of the present disclosure is clearly and completely described in the following with reference to the drawings and embodiments. Obviously, the described embodiments are only a part of the embodiments of the present disclosure, but not all embodiments. All other embodiments obtained by those skilled in the art based on the embodiments of the present disclosure without creative efforts are within the scope of the present disclosure.

Figure 1:
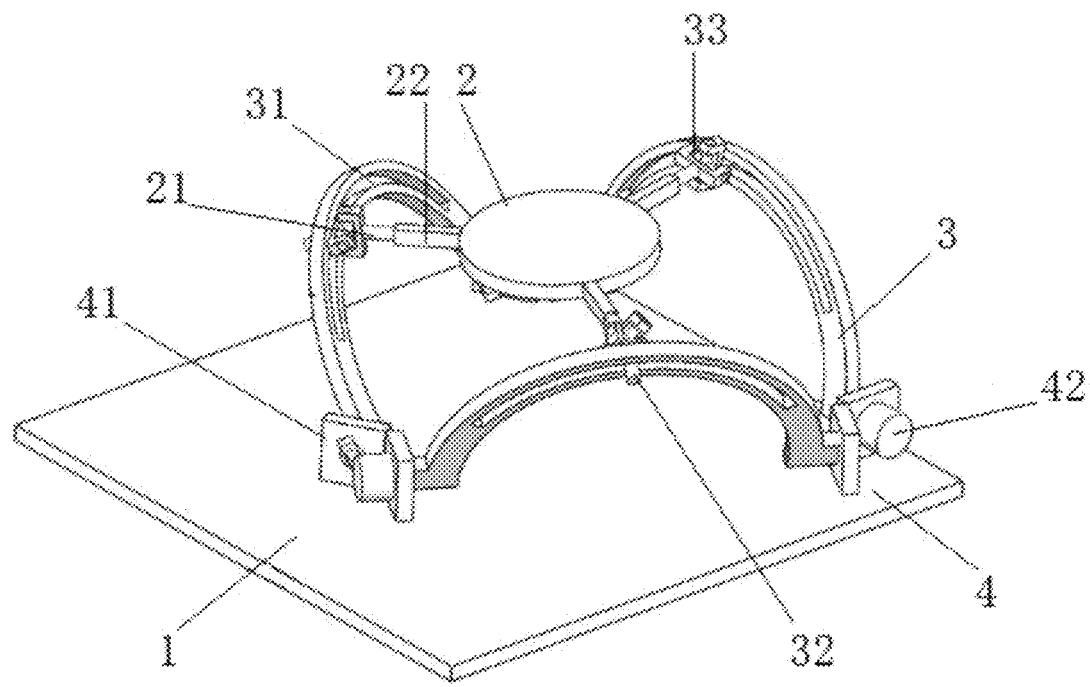
FIG. 1 is a structural schematic diagram of a 3 degree-of-freedom (DOF) parallel mechanism with 3 branched-chains of an embodiment of the present disclosure.

As shown in FIG. 1, the present disclosure provides a 3 degree-of-freedom (DOF) parallel mechanism with 3 branched-chains, which includes a fixed platform 1 and a movable platform 2 disposed above the fixed platform 1. The fixed platform 1 is in a fixed status. The movable platform 2 is moved relative to the fixed platform 1. The parallel mechanism further includes three arc-shaped connecting rods 3, which are all rotated and connected with the fixed platform 1. The arc-shaped connecting rods 3 are disposed on the fixed platform 1. Under action of the external force, the arc-shaped connecting rods 3 are rotated relative to the fixed platform 1. The rotation axes of three arc-shaped connecting rods 3 are intersected with each other and each rotation axes is parallel to the fixed platform 1. Each arc-shaped connecting rod 3 has a sliding slot 31 curved extending along a longitudinal direction. The sliding slot 31 is arc shaped. Three connecting shafts 21 one-to-one corresponds to the three arc-shaped connecting rods 3 and are disposed on the movable platform 2. A first end of each connecting shaft 21 is fixedly connected with the movable platform 2. A second end is hinged joint with a connecting head 32. The connecting head 32 is slid and disposed in the corresponding sliding slot 31. In the embodiment, the movable platform 2 is connected with the fixed platform 1 through the three arc-shaped connecting rods 3. Thus, the movable platform 2 is disposed above the fixed platform 1. The movable platform 2 is slid and connected with each arc-shaped connecting rod 3. Each arc-shaped connecting rod 3 is rotated and connected with the fixed platform 1. When one of the three arc-shaped connecting rods 3 is rotated around its own rotation shaft, relative to the fixed platform 1, the movable platform 2 is driven to move by the arc-shaped connecting rod 3 through the corresponding connecting head 32 and the connecting shafts 21. At the same time, the other two connecting shafts 21 and the connecting heads 32 are slid along the corresponding sliding slot 31. Since the sliding slot 31 is an arc-shaped structure, the movable platform 2 is overturned above the fixed platform 1. The movement is relatively simple. Namely, when one of the arc-shaped connecting rod 3 is controlled to rotate, the movable platform 2 is overturned in one direction around a certain point in the air. When the different arc-shaped connecting rods 3 are controlled to rotate, the movable platform 2 is overturned in different directions around the certain point in the air. Because there are three arc-shaped connecting rods 3, the movable platform 2 of the parallel mechanism is overturned in three different directions around the certain point in the air. In the above control mode, the movable platform 2 is relatively stable when the movable platform 2 is overturned in any direction. The robustness and the bearing capacity of the movable platform 2 are very good, the control precision is high, which avoids forming accompanying movement during overturn and has high flexibility. The structure of the parallel mechanism is very simple and convenient to assemble.

Figure 2:
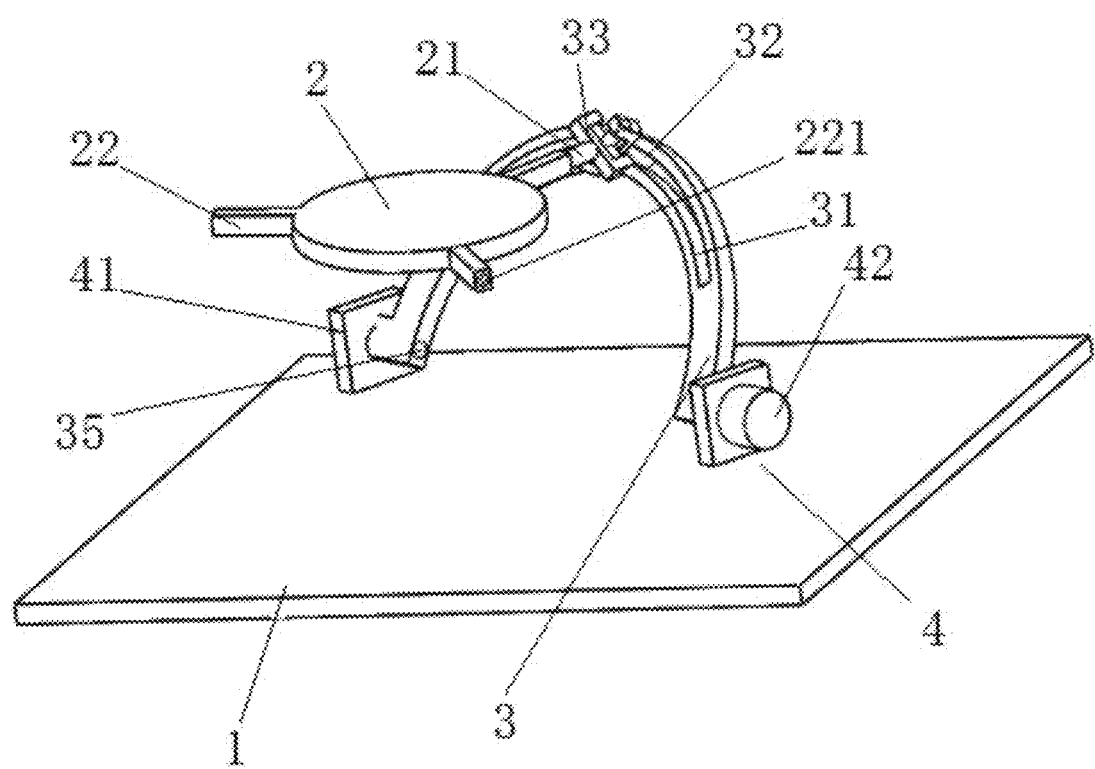
FIG. 2 is a connecting structural schematic diagram of an arc-shaped connecting rod and corresponding connecting component of the 3 DOF parallel mechanism with 3 branched-chains.

As shown in FIG. 1 and FIG. 2, optimizing the above embodiment, there are various structural types for the hinge joint between the connecting head 32 and the corresponding connecting shaft 21. For example, the connecting head 32 and the corresponding connecting shaft 21 are connected by cross universal hinge 33. When the moving platform 2 drives the connecting shaft 21 to overturn, the connecting head 32 can also slide along the corresponding sliding slot 31, it should be understood that other structural types are used, such as: the connecting head 32 and the connecting shaft 21 are connected by a spherical hinge.

Furthermore, the two ends of each arc-shaped connecting rod 3 are fixedly connected with the fixed platform 1 through a connecting component 4. The two ends of each arc-shaped connecting rod 3 are rotated and connected with the corresponding connecting component 4. In the embodiment, the two ends of each arc-shaped connecting rod 3 are disposed on the fixed platform 1 by the connecting component 4. The two ends of the arc-shaped connecting rod 3 are rotation ends. When the arc-shaped connecting rod 3 is driven to rotate, since the two ends are located, the rotation is very stable, further ensuring the robustness and load bearing capacity when the movable platform 2 is rotated.

Figure 3:
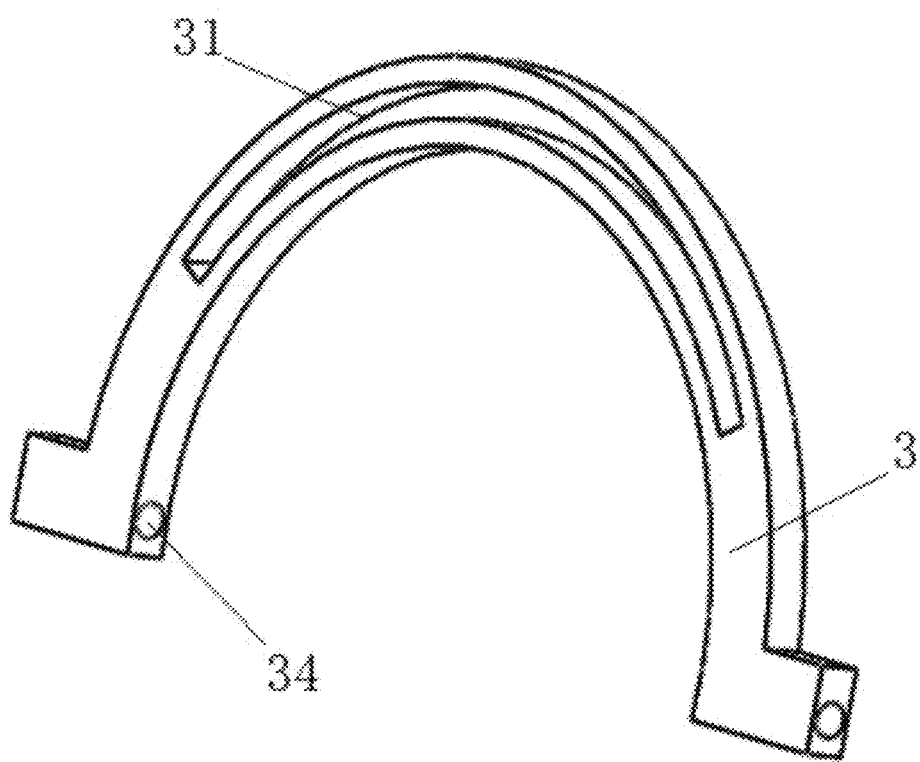
FIG. 3 is a structural schematic diagram of the arc-shaped connecting rod of the 3 DOF parallel mechanism with 3 branched-chains.

As shown in FIG. 2 and FIG. 3, the above structure of the connecting component 4 is detail described. Each connecting component 4 includes two supports 41 fixedly disposed on the fixed platform 1. The two ends of the arc-shaped connecting rod 3 both includes a shaft hole 34 and a pin shaft 35 fixed inside the shaft hole 34. The pin shaft 35 is rotated and connected with the corresponding support 41. The two supports 41 of each connecting component 4 are fixed on the fixed platform 1 by screws etc. the other shaft hole is disposed on each support 41. The two shaft holes of each connecting component 4 are located on a same straight line. The fixed pin shafts 35 fixed on the two ends of the arc-shaped connecting rod 3 respectively stick into the shaft holes of the corresponding supports 41. The arc-shaped connecting rod 3 can rotate relative to the two supports 41. Certainly, each pin shaft 35 and the support 41 should be located to prevent the pin shaft 35 pulling out from the corresponding shaft hole during the relation. Generally, the two supports 41 of each connecting component 4 are oppositely disposed. The two ends of each arc-shaped connecting rod 3 are both disposed between the corresponding two supports 41. In the structural configuration, the two ends of the arc-shaped connecting rod 3 are sandwiched between the two supports 41, which effectively avoids the pin shaft 35 from falling off the shaft hole of the corresponding bracket 41 during the process of rotation. Thereby, the stability of the connection structure between the arc-shaped connecting rod 3 and the connecting component 4 is improved.

As shown in FIG. 1 and FIG. 2, furthermore, each connecting component 4 corresponds to a motor 42. The motor 42 is disposed on one of the supports 41 of the corresponding connecting component 4. An output shaft of the motor 42 is fixedly connected with the rotating shaft 34 at one end of the corresponding arc-shaped connecting rod 3, or other types of transmission connections are used between the output shaft of the motor 42 and the rotating shaft 34. The pin roll 35 is rotated by the motor 42, thus, the arc-shaped connecting rod 3 is overall rotated. In the embodiment, the motor 42 is a servo motor 42, which is convenient to control the rotation speed. The motor 42 directly is disposed on the fixed platform 1 or fixed on the corresponding bracket 41. The motor 42 is regarded as a driving pair for the corresponding arc-shaped connecting rod 3. The three motors 42 are respectively controlled the rotation of the three arc-shaped connecting rods 3. The operation is simple and the control is more flexible.

As shown in FIG. 2, furthermore, three protrusions 22 are disposed on the movable platform 2. The three protrusions 22 and the movable platform 2 are integrally formed and one-to-one correspond to the three connecting shafts 21. The connecting shaft 21 is fixed and connected with the corresponding protrusion 22. In the embodiment, when the movable platform 2 is manufactured, the three protrusions 22 are formed on the movable platform 2. Thereby, the movable platform 2 is fixedly connected with the three connecting shafts 21 and the parallel mechanism is convenient to assemble. To be specific, a threaded hole 221 is disposed at an end of the protrusions 22 away from the movable platform 2. The corresponding connecting shaft 21 sticks into the threaded hole 221 and the threaded connection is formed, which is convenient to assemble and connect and make connection stability relatively high. Generally, the movable platform 2 is a flat cylindrical shape. The three protrusions 22 are evenly interval distribution along an outer circular surface of the movable platform 2. Thereby, the three connecting shafts 21 are also evenly distributed along the outer circular surface of the movable platform 2. An angle between the adjacent two connecting shafts 21 is 120 degrees.

The mentioned above is only the preferred embodiment of the present disclosure, but it is not to limit the present disclosure. Any modifications, equivalent substitutions, improvements, etc. made within the spirit and scope of the present disclosure are included within the scope of the present invention.

The invention claimed is:

1. A three-degree-of-freedom (3-DOF) parallel mechanism with three branches, comprising:
    a fixed platform;
    a movable platform, disposed above the fixed platform; and
    three arc-shaped connecting rods, each of which rotatably connected to the fixed platform;
    wherein rotational axes of the three arc-shaped connecting rods intersect each other and each of the rotational axes is parallel to the fixed platform, wherein each of the three arc-shaped connecting rods is provided with a sliding groove curvily extending along a longitudinal direction of the arc-shaped connecting rod, wherein the movable platform is provided with three connecting shafts that are in one-to-one correspondence with the three arc-shaped connecting rods, wherein a first end of each of the three connecting shafts is fixedly connected to the movable platform, and a second end of the connecting shaft is hinged with a connecting head, the connecting head being slidably arranged in a corresponding sliding groove;
    wherein two ends of each of the three arc-shaped connecting rods are each fixedly connected to the fixed platform through a connecting assembly, and the two ends of each of the three arc-shaped connecting rods are each rotatably connected to the corresponding connecting assembly;
    wherein each connecting assembly comprises two supports fixedly disposed on the fixed platform, and the two ends of each of the three arc-shaped connecting rods are each rotatably connected to a corresponding support by a pin shaft;
    wherein the two supports are oppositely disposed, and the two ends of each of the three arc-shaped connecting rods are both disposed between the two corresponding supports.

2. The 3-DOF parallel mechanism as recited in claim 1, wherein each connecting head and a corresponding connecting shaft are connected by a cross universal hinge.

3. The 3-DOF parallel mechanism as recited in claim 1, wherein a motor is disposed on one of the two supports of the corresponding connecting assembly, and the pin shaft is driven to rotate by the motor.

4. The 3-DOF parallel mechanism as recited in claim 1, wherein the movable platform is flat cylindrical shaped; the three connecting shafts are evenly distributed along an outer cylindrical surface of the movable platform.

5. The 3-DOF parallel mechanism as recited in claim 1, wherein the movable platform is integrally formed with three protrusions, which are in one-to-one correspondence with the three connecting shafts, wherein each of the three connecting shafts is fixedly connected to a corresponding protrusion.

* * * * *